United States Patent [19]
Dingwall et al.

[11] Patent Number: 5,793,122
[45] Date of Patent: Aug. 11, 1998

[54] AUTOMOBILE SECURITY DEVICE

[75] Inventors: Robert P. Dingwall, Stratford; Howard T. Bellin, New York, both of N.Y.

[73] Assignee: Motor Vehicle Protection Systems, Inc., Wayland, Mass.

[21] Appl. No.: 661,647

[22] Filed: Jun. 11, 1996

[51] Int. Cl.$^6$ .................................................. H02G 3/00
[52] U.S. Cl. .................. 307/10.3; 307/10.1; 307/10.2; 200/61.08; 200/61.18; 70/252; 70/240; 340/426
[58] Field of Search .................. 70/252, 256, 257, 70/240, 237; 180/287; 340/425.5, 426, 428, 825.3, 825.31, 825.34, 429, 438, 825.36, 825.69, 825.72; 307/9.1, 10.8; 200/61.08, 61.18, 43.03, 61.54; 364/423.098, 423.099, 424.045, 424.051–424.055, 424.059

[56] References Cited

U.S. PATENT DOCUMENTS

| | | | |
|---|---|---|---|
| 1,691,774 | 11/1928 | Matson | 70/252 |
| 3,538,725 | 11/1970 | Guenther et al. | 70/241 |
| 3,651,329 | 3/1972 | Marlowe et al. | 307/10.3 |
| 3,797,287 | 3/1974 | Iba et al. | 70/252 |
| 3,820,361 | 6/1974 | Leitner | 70/252 |
| 3,827,526 | 8/1974 | Smith | 180/287 |
| 3,902,341 | 9/1975 | Peitsmeier | 70/252 |
| 3,949,581 | 4/1976 | Toyama et al. | 70/252 |
| 4,332,306 | 6/1982 | Turatti | 180/287 |
| 4,427,967 | 1/1984 | Maiocco | 70/252 |
| 4,449,605 | 5/1984 | Read | 180/287 |
| 4,595,903 | 6/1986 | Arlasky et al. | 307/10.3 |
| 4,627,514 | 12/1986 | Brown | 180/287 |
| 4,781,268 | 11/1988 | Richardson | 108/287 |
| 4,803,460 | 2/1989 | Rhee et al. | 340/428 |
| 5,551,267 | 9/1996 | Janssen et al. | 307/10.3 |
| 5,582,047 | 12/1996 | Jeffries | 70/252 |
| 5,638,944 | 6/1997 | Diebel et al. | 200/51 R |

Primary Examiner—William M. Shoop, Jr.
Assistant Examiner—Peter Ganjian
Attorney, Agent, or Firm—Heslin & Rothenberg, P.C.; Wayne F. Reinke, Esq.

[57] ABSTRACT

A triggering pin is connected between the steering column cover and the ignition switch lock, or a glass bead is held between the ignition switch lock and the ignition switch lock mounting assembly, of an automobile including a steering column lock. When either the steering column cover in the area of the ignition switch lock or the ignition switch lock itself is removed, the triggering pin or bead, connected to a trigger wire, triggers a switch that removes power from a propulsion system function necessary for the driving of the vehicle. In addition, where the automobile includes a conventional security system, the triggering of the security device trips a switch to provide power to the conventional security system. Power may also be provided to a hood lock spliced onto the hood release cable that, when actuated, prevents the cable from moving.

33 Claims, 13 Drawing Sheets

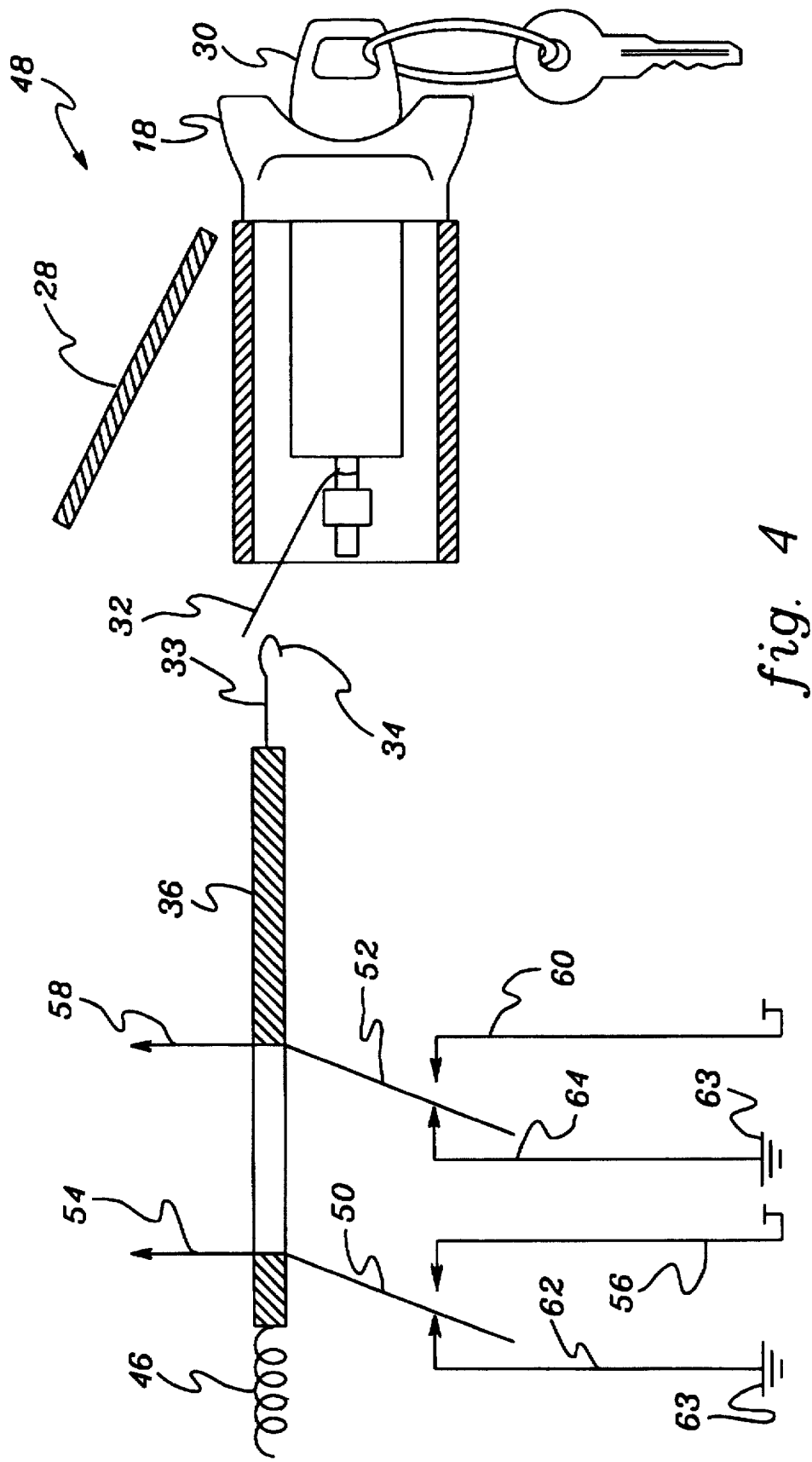

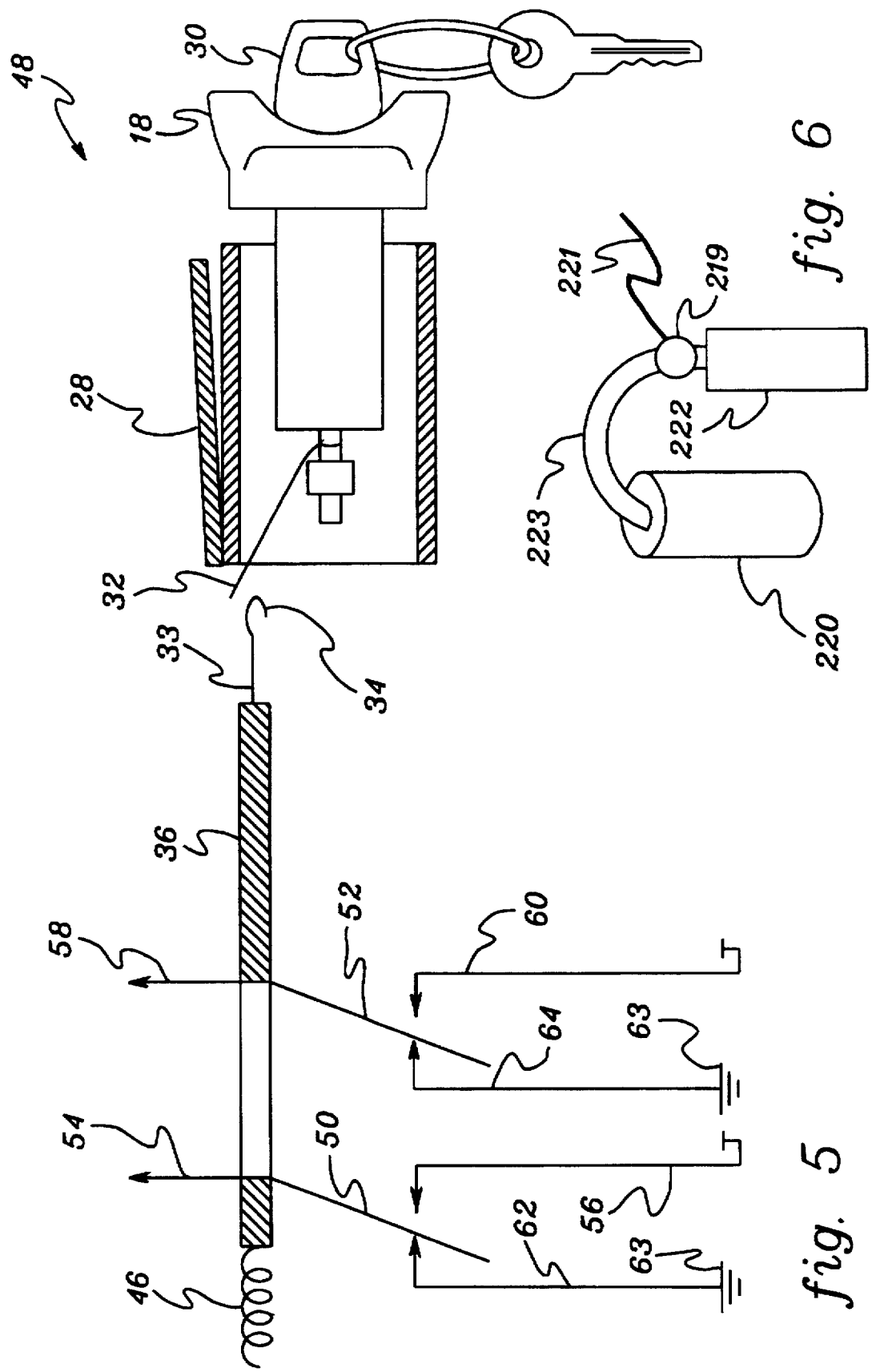

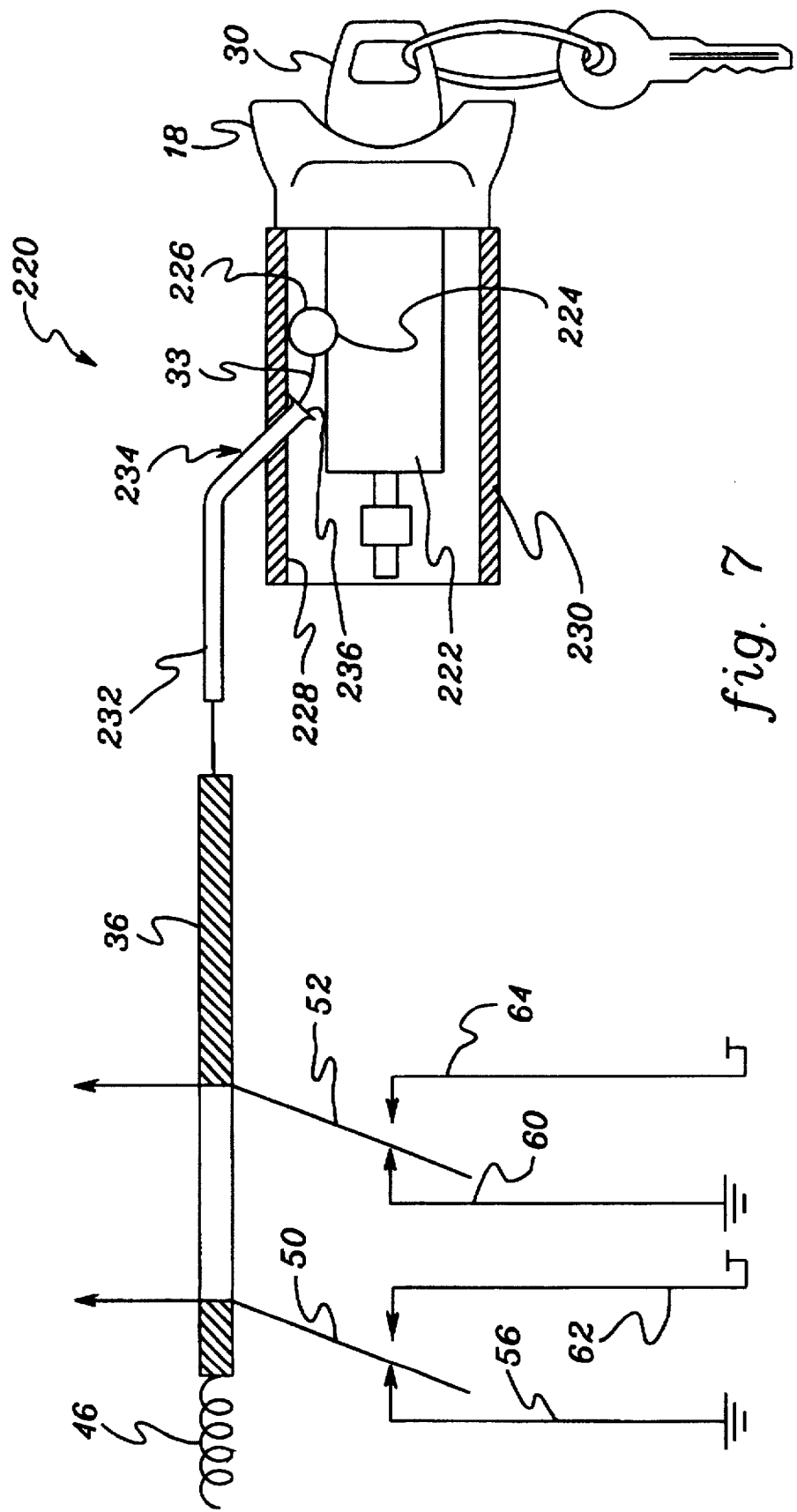

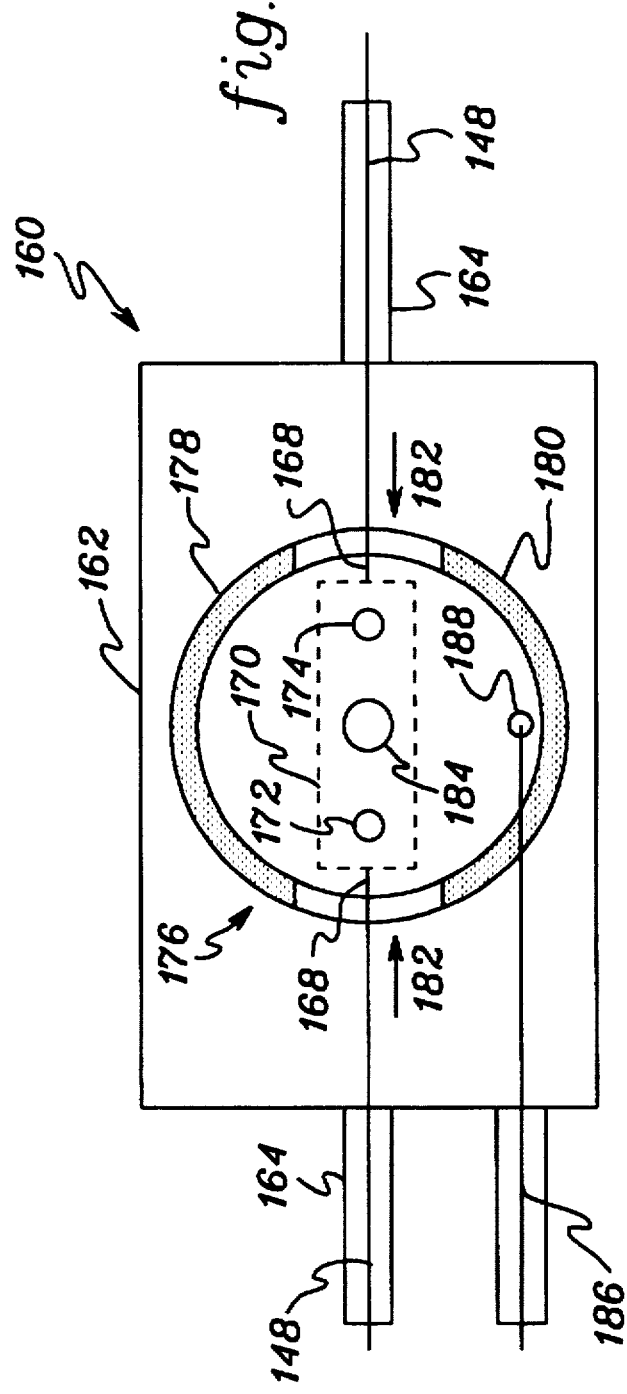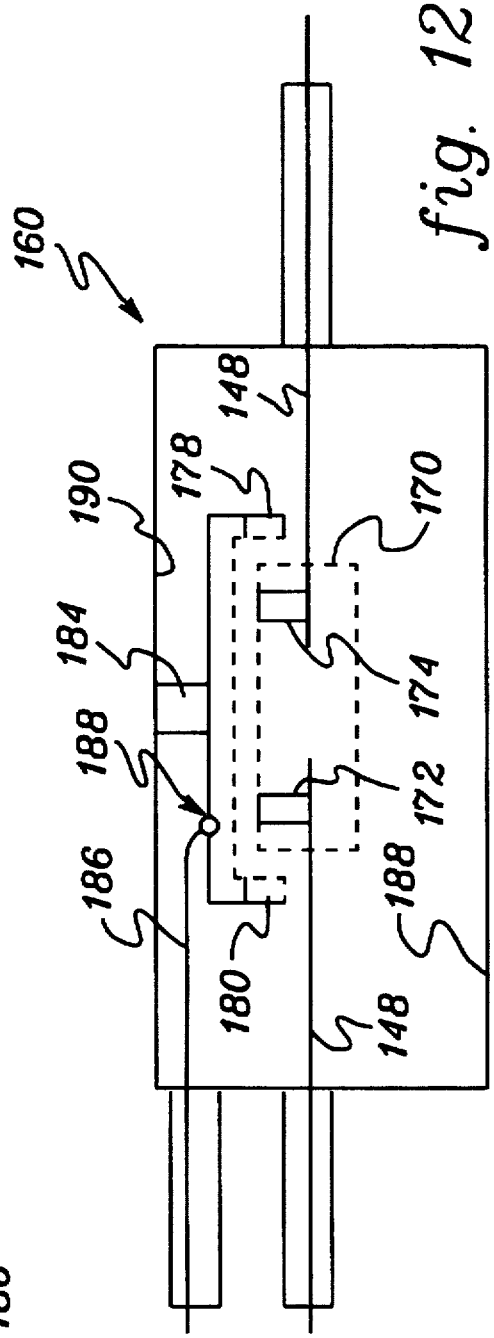

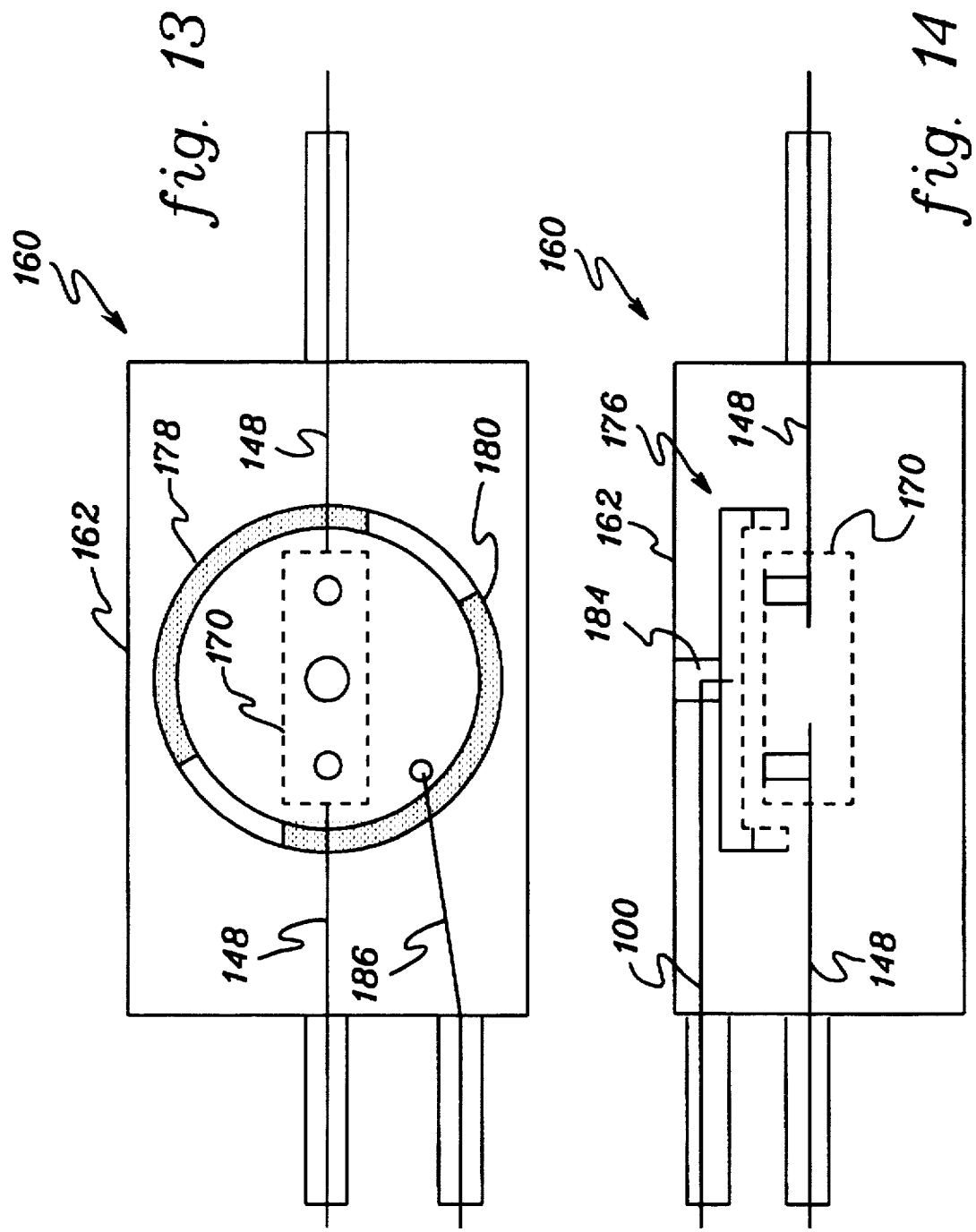

AUTOMOBILE SECURITY DEVICE

BACKGROUND OF THE INVENTION

1. Technical Field

The present invention generally relates to security systems. More particularly, the present invention relates to an automobile security device.

2. Background Information

Automobile thefts have dramatically increased in recent years. Such thefts affect not only the party from whom the vehicle is stolen, but results in insurance premium increases for everyone. In response to the increase in thefts, automobile security devices have been offered, but have not generally had a significant impact. For example, conventional automobile security systems producing sound and/or lights upon triggering have generally come to be ignored by those in the vicinity of the vehicle when they are triggered, due to the ease and frequency of same. In addition, these conventional systems generally require the owner to arm them each time they leave their automobile, and disarm them when they return to them or when they are triggered by mistake. Further, as automobile security systems have evolved, they have increased the number of features and the complexity of operation, without dramatically increasing their effectiveness. Further, such automobile security systems alone are generally impractical, since they do not physically inhibit the theft. Still further, automobile security systems often interfere with vehicle servicing.

Therefore, a need exists for a simple automobile security device that does not merely rely on the reactions of those in the vicinity of the automobile, requires little or preferably no operation by the owner, and physically inhibits automobile theft.

SUMMARY OF THE INVENTION

Briefly, the present invention satisfies the need for a simple automobile security device requiring no operation by the owner, the placement of which does not interfere with vehicle servicing and which physically inhibits the automobile theft by providing an automobile security device that takes advantage of the need for a thief to defeat a steering column lock.

In accordance with the above, it is an object of the present invention to provide a relatively simple automobile security device.

It is another object of the present invention to provide a simple automobile security device that does not only rely on the reactions of those in the vicinity of the automobile to thwart the theft.

It is a another object of the present invention to provide an automobile security device that requires no operation by the owner.

It is a further object of the present invention to provide an automobile security device that does not interfere with a mechanic's ability to service the vehicle.

Still further, it is an object of the present invention to provide an automobile security device that physically inhibits an automobile theft.

The present invention provides, in a first aspect, a security device for an automobile including a steering column and a steering column lock, comprising indicating means for indicating an attempt to defeat the steering column lock. The security device further comprises disabling means coupled to the indicating means for affecting one or more functions of the automobile in response to the indicating means indicating the attempt.

The present invention provides, in a second aspect, a method for inhibiting the theft of an automobile including a steering column and a steering column lock, the method comprising steps of indicating an attempt to defeat the steering column lock, and affecting one or more functions of the automobile in response to the attempt.

The present invention provides, in a third aspect, a security device for an automobile including a passenger cabin, a propulsion system, a hood covering the propulsion system, a hood latch and a hood latch release mechanism including a cable coupled to the hood latch and a trigger mechanism within the passenger cabin. The security device comprises a housing surrounding a portion of the cable, a rotatable member coupled to an interior surface of the housing, the rotatable member including two sections spaced apart such that a through opening is created in the rotatable member, and a moveable member situated within the housing and connected to the cable. The moveable member is sized to fit within the throughopening. When the rotatable member is rotated such that the two sections line up with either end of the moveable member, the cable is prevented from moving and the hood latch is prevented from being released.

The present invention provides, in a fourth aspect, a method of installing a security device of the third aspect. The method comprises steps of cutting the cable to create two free ends, splicing the moveable member onto the cable at the two free ends, securing the housing with the rotatable member around the moveable member and the cable, and connecting the rotatable member to an actuator.

These, and other objects, features and advantages of this invention will become apparent from the following detailed description of the various aspects of the invention taken in conjunction with the accompanying drawings.

BRIEF DESCRIPTION OF THE DRAWINGS

FIG. 2A depicts an alternative embodiment of the resetting mechanism of FIG. 2.

FIG. 4 depicts the steering column portion and security device of FIG. 3 during a first process for triggering the security device.

FIG. 5 depicts the steering column portion and security device of FIG. 3 during a second process for triggering the security device.

FIG. 6 depicts a portion of the propulsion system of the FIG. 1 automobile in more detail.

FIG. 7 is a partial cross-sectional view of the portion of the steering column and security device of FIG. 1 with an alternate means for indicating an attempt to defeat the steering column lock.

FIG. 11 is a top view of a hood lock according to the present invention in an unlocked position.

FIG. 12 is a cross-sectional view of the hood lock of FIG. 11 in a locked position.

FIG. 13 is a top view of the hood lock of FIG. 11 in a locked position.

FIG. 14 is a cross-sectional view of the hood lock of FIG. 11 with electric actuation.

BEST MODE FOR CARRYING OUT THE INVENTION

Figure 16:
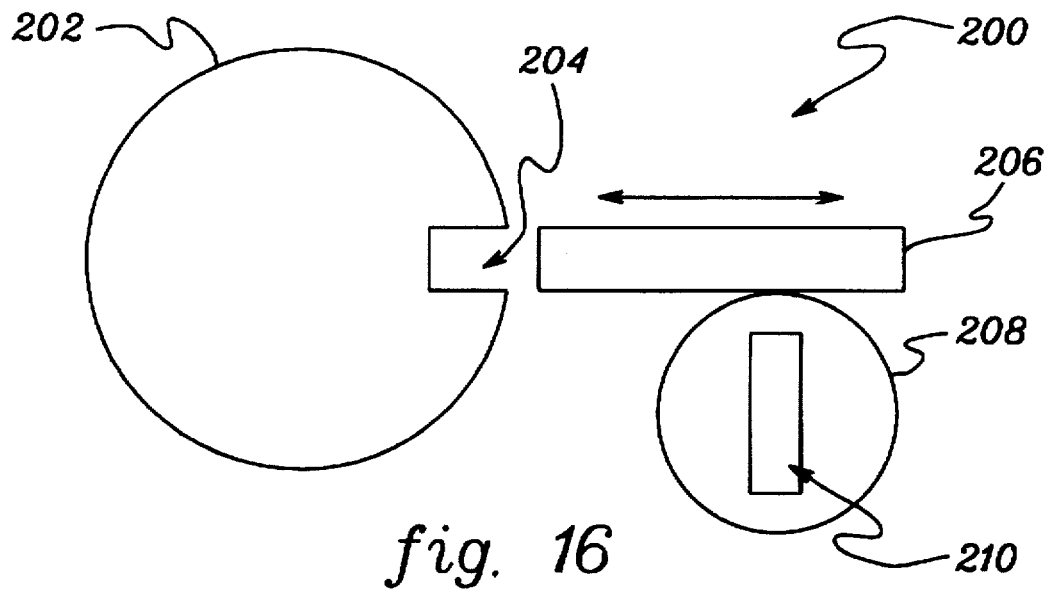
FIG. 16 is a simplified block diagram of an exemplary steering column lock mechanism in an unlocked position with which the present invention can be used.
Figure 17:
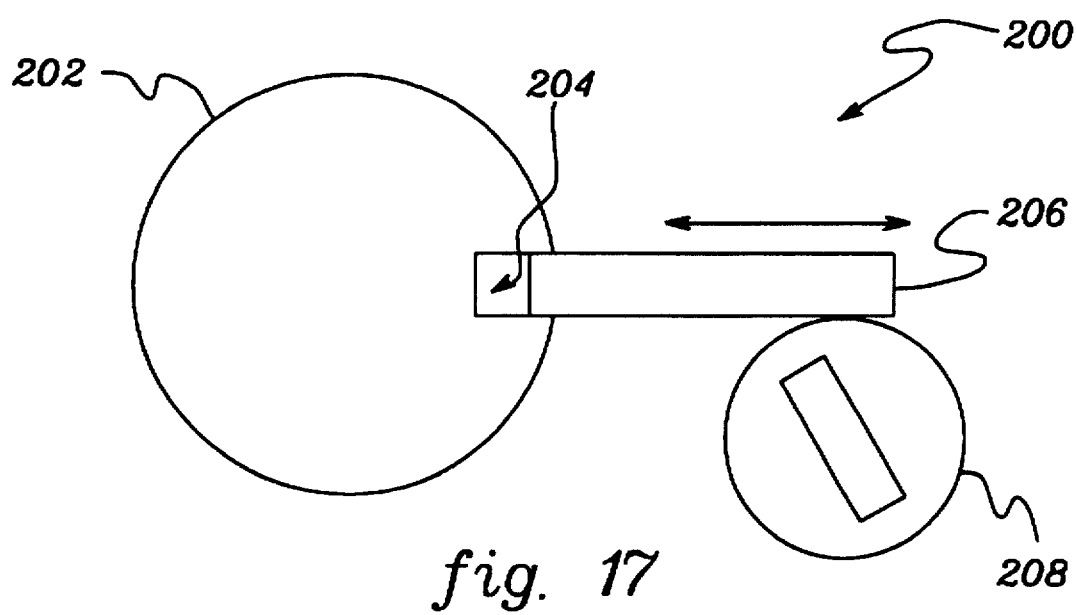
FIG. 17 shows the steering column lock mechanism of FIG. 16 in a locked position.

The vast majority of automobiles produced in the world today include a steering column lock (all automobiles sold in the United States have one). The steering column lock prevents steering when the ignition switch lock is in the proper position. In order for a thief to drive away an automobile, the thief must first defeat the steering column lock. Modern automobiles cannot simply be "hot wired" and stolen. Even if a thief succeeds in starting the engine; the steering column lock must still be defeated in order to steer the vehicle. The steering column lock is sometimes defeated by removing the steering column cover and disassembling the ignition switch lock or, more often, by physically removing the ignition switch lock using a "slammer" device and inserting a screwdriver to use as a key. Each of FIGS. 16 and 17 is a simplified block diagram of a steering column lock mechanism 200 exemplary of those found in modern automobiles. Mechanism 200 comprises steering column 202 with slot 204, locking pin 206, and ignition switch lock 208 with opening 210 for a key (not shown). Ignition switch lock 208 is shown in the unlocked position in FIG. 16. FIG. 17 shows ignition switch lock 208 in the locked position, which causes locking pin 206 to move into slot 204, such that steering column 202 can no longer be rotated. The present invention takes advantage of the need to defeat the steering column lock by inhibiting the operation of the vehicle in response to an attempt to defeat the steering column lock.

Figure 1:
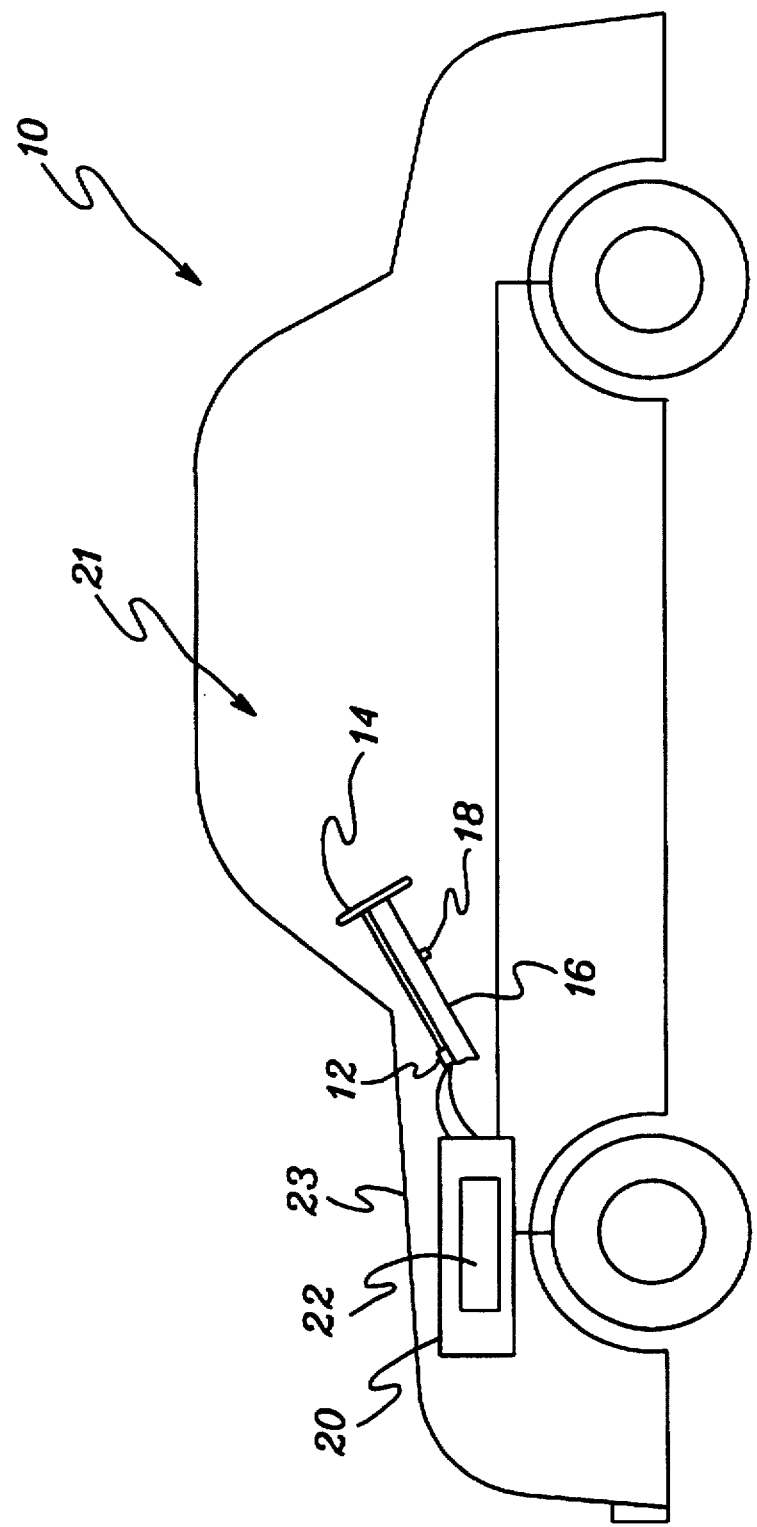
FIG. 1 depicts an automobile including an automobile security device in accordance with the present invention.

FIG. 1 depicts an automobile 10 with a security device 12 according to the present invention. Automobile 10 includes steering wheel 14, steering column 16, ignition switch lock 18, propulsion system 20 including internal combustion engine 22, passenger cabin 21, and a hood 23 covering propulsion system 20. As used herein, the term "automobile" is intended to include any passenger vehicle capable of movement. The term "propulsion system" is intended to include any means now known or hereafter invented that enables movement of an automobile. The term "steering column" is intended to include any mechanical means of extending directional controls for an automobile to reach the operator. The term "steering column cover" refers to an outer portion of the steering column for concealing wires and the like. The term "ignition switch lock" refers to any mechanism within an automobile operable by an operator for starting the automobile and locking and unlocking the steering column lock.

Figure 2:
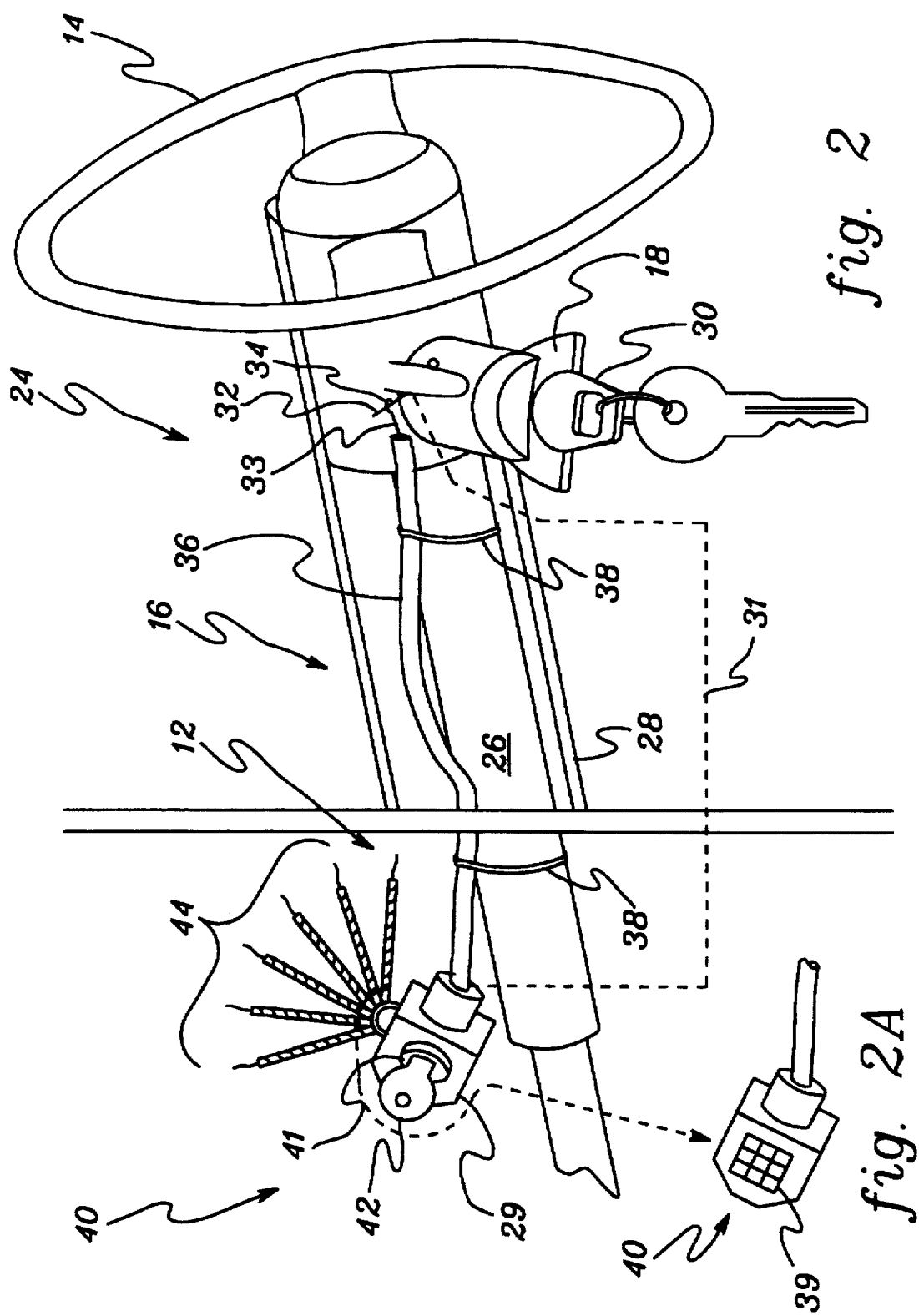
FIG. 2 depicts the steering column and security device of the automobile of FIG. 1 in more detail.

FIG. 2 depicts a portion 24 of the steering column assembly of FIG. 1 in detail. As shown partially cut away, steering column 16 comprises center portion 26 and cover portion 28. Ignition switch lock 18 is shown with ignition key 30 therein. Security device 12 comprises indicating means 31, comprising triggering pin 32, trigger wire 33 with hook 34, and jacketed control cable 36 held to center portion 26 by ties 38. Security device 12 further comprises disabling means 39, comprising security housing 40 including lock 41, reset key 42 and wire bundle 44. Preferably, jacketed control cable 36 is armored to inhibit the cutting of same.

As used herein, the term "indicating means" is intended to include any means (mechanical and/or electrical and/or other) for indicating an attempt to defeat the steering column lock when the steering column cover near the ignition switch lock is being tampered with and/or the ignition switch lock is being pulled away from the steering column. As used herein, the term "disabling means" is intended to include any means (mechanical and/or electrical and/or other) for disabling, enabling or otherwise affecting a function of the propulsion system or other system within an automobile in response to the indicating means indicating a security breach.

The operation of security device 12 will now be described in detail. Shown most clearly in FIG. 3, triggering pin 32 is connected in some manner to ignition switch lock 18 and held in place at its other end by cover portion 28 of steering column 16. When held in place at both ends, triggering pin 32 enables tension on control cable 36 via spring 46. However, when either cover portion 28 no longer holds triggering pin 32 or ignition switch lock 18 is pulled away from the steering column, cable hook 34 pulls away from pin 32 (see FIGS. 4 and 5), and triggers switches in security housing 40. The switches affect power via wire bundle 44 to propulsion system and other automobile functions. After security device 12 has been triggered and the theft successfully thwarted, reset key 42 is placed in the lock 41 of security housing 40 and turned to reset the switches. Preferably, security housing 40 includes some mechanism (mechanical and/or electrical), lock 41 and reset key 42 being one example, to reset the security system and allow normal operation of the vehicle. Other exemplary embodiments of the reset feature include remote control resetting and resetting based on a security code entered via a key pad 39 (see FIG. 2A).

Figure 3:
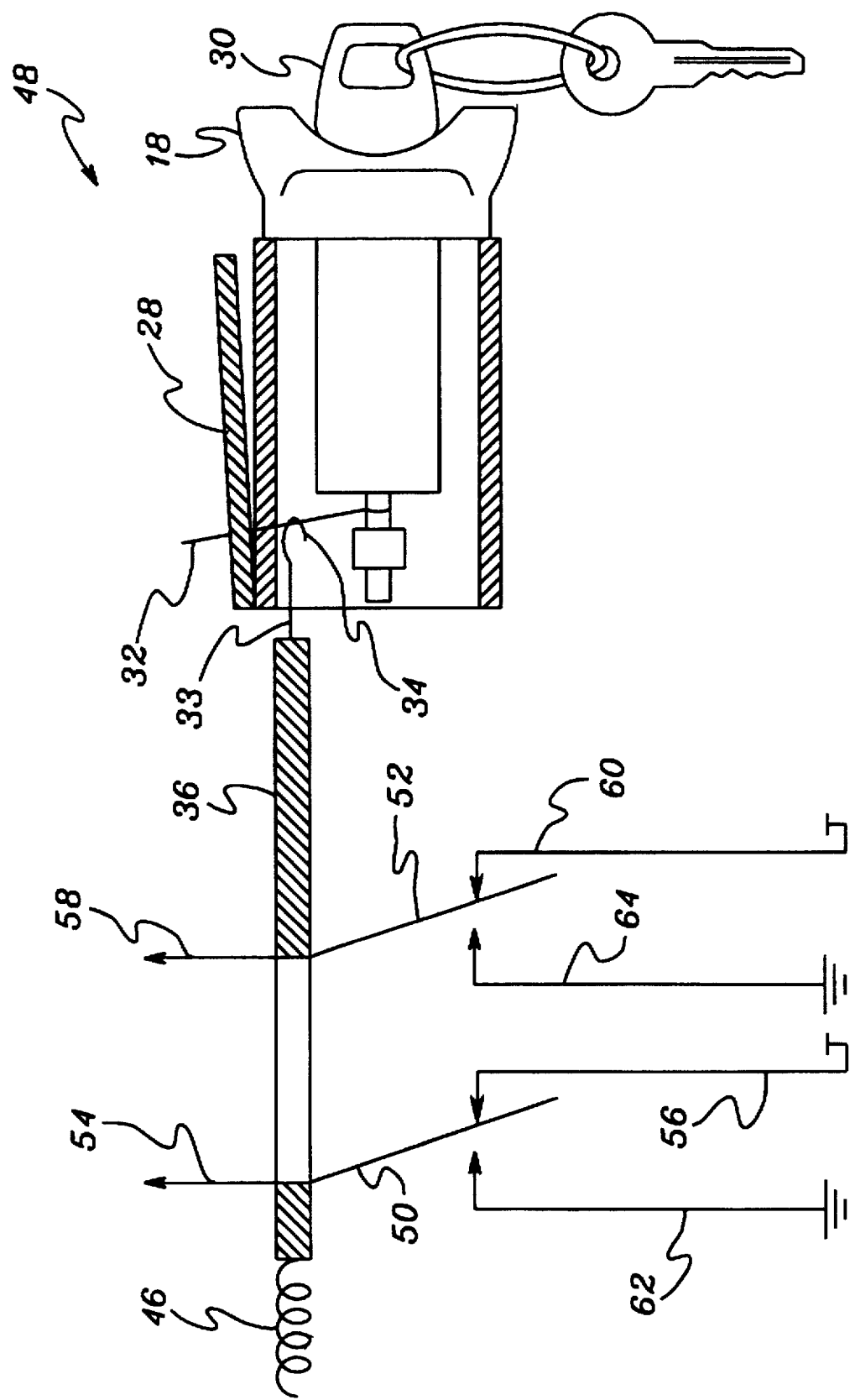
FIG. 3 is a partial cross-sectional view of a portion of the steering column and security device of FIG. 2.

FIG. 3 depicts the indicating means 31 of security device 12 with exemplary switches 50 and 52 from security housing 40. When steering column cover portion 28 and ignition switch lock 18 are intact, switch 50 connects fuel pump wire 54 with 12 volts DC power via power wire 56. Similarly, when untriggered, switch 52 connects starter wire 58 with power wire 60. However, as shown in FIG. 4, when triggered by the removal of steering column cover portion 28 holding triggering pin 32, switch 50 connects fuel pump wire 54 with ground wire 62, which connects to a grounded point 63 in automobile 10, and switch 52 connects starter wire 58 with ground wire 64. Similarly, as shown in FIG. 5, when triggered by the removal of ignition switch lock 18, switch 50 connects fuel pump wire 54 with ground wire 62, and switch 52 connects starter wire 58 with ground wire 64. It will be understood that although an electric fuel pump and starter are used in the present embodiment as examples of automobile functions to be inhibited, other functions could be inhibited, such as, for example, the function of the transmission.

For expensive automobiles, a thief with the time (approximately 30 minutes) often avoids damage to the automobile, such as that produced from the use of a "slammer" device, so that the automobile can be sold. Automobiles left at the train station during the working day are a good example. In such a case, the thief carefully removes the steering column cover, drills a hole to remove a pin used to hold the ignition switch lock and simply slides the ignition switch lock out from the steering column. For such situations, a two-stage trigger device is preferred; one stage attaches to the steering column cover, and the other stage attaches to the ignition switch lock.

Figure 18:
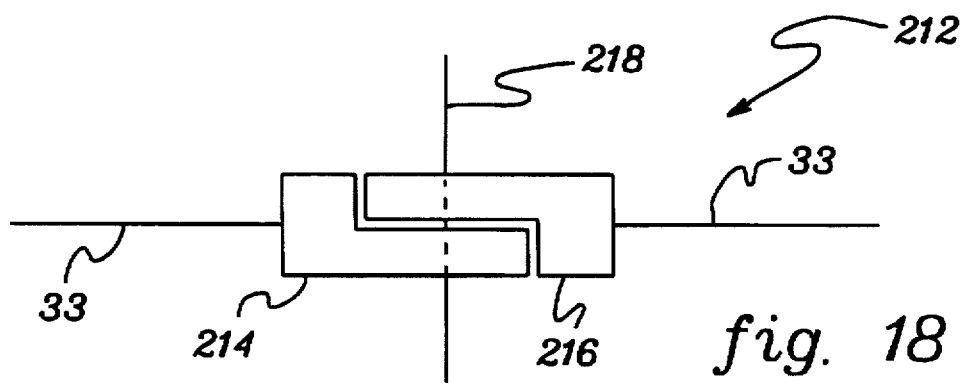
FIG. 18 depicts a two-state trigger mechanism according to the present invention.

Reference is now made to FIG. 18, depicting a two-stage trigger device 212. Two-stage trigger device 212 comprises a pair of clamps 214 and 216, each connected to trigger wire 33, which has been separated. A secondary trigger wire 218 holds clamps 214 and 216 together, and is connected to the steering column cover. If secondary trigger wire 218 is removed for any reason, clamps 214 and 216 separate, triggering switches 50 and 52.

FIG. 6 depicts the air intake manifold 220 of propulsion system 20 of FIG. 1. Also shown is a compressed gas tank 222 filled with a gas, other than oxygen, that will prevent combustion within internal combustion engine 22 by depriving it of oxygen. Examples of a suitable gas include carbon dioxide, nitrogen and halogen. Of these exemplary gases, nitrogen is preferred because it is relatively safe and inexpensive, although halogen would be the most effective. The effect on the engine of a short-lived burst of such a gas (e.g., 10 seconds) may last up to about one hour and no long-term adverse effects on the engine are believed present. Compressed gas tank 222 includes an electrically actuated valve 219 coupled to wire 221 going to a switch in security housing 40. As valve 219 is opened, gas travels through hose 223 to air intake manifold 222.

FIG. 7 is similar to FIG. 3, except that an alternate means 220 of indicating an attempt to defeat the steering column lock (a universal trigger device) is shown. As shown in FIG. 7, ignition switch lock 18 includes an outer casing 222 with a recess or depression 224 therein. Trigger wire 33, under tension, is threaded through glass bead 226, which is held between recess 224 and an interior surface 228 of ignition switch lock mounting assembly 230, shown cut away in FIG. 7. Trigger wire 33 is surrounded by steel tubing 232 fitted in opening 234, which could be drilled. Steel tubing 232 includes a flared end 236 to ensure that it does not slip through opening 234. Steel tubing 232 is sized to fit within jacketed control cable 36. If the ignition switch lock mounting assembly 230 above the bead is broken off or otherwise removed, the glass bead 226 may shatter, allowing trigger wire 33 to retreat into steel tubing 232, triggering switches 50 and 52 (the triggering mechanics will be described subsequently). In addition, if the ignition switch lock 18 is pulled away from assembly 230, the bead will move with it and trigger switches 50 and 52. It will be understood that bead 206 need not be glass; it could be comprised of other materials, such as, for example, a metal. However, it is preferably a material that could be shattered.

Figure 8:
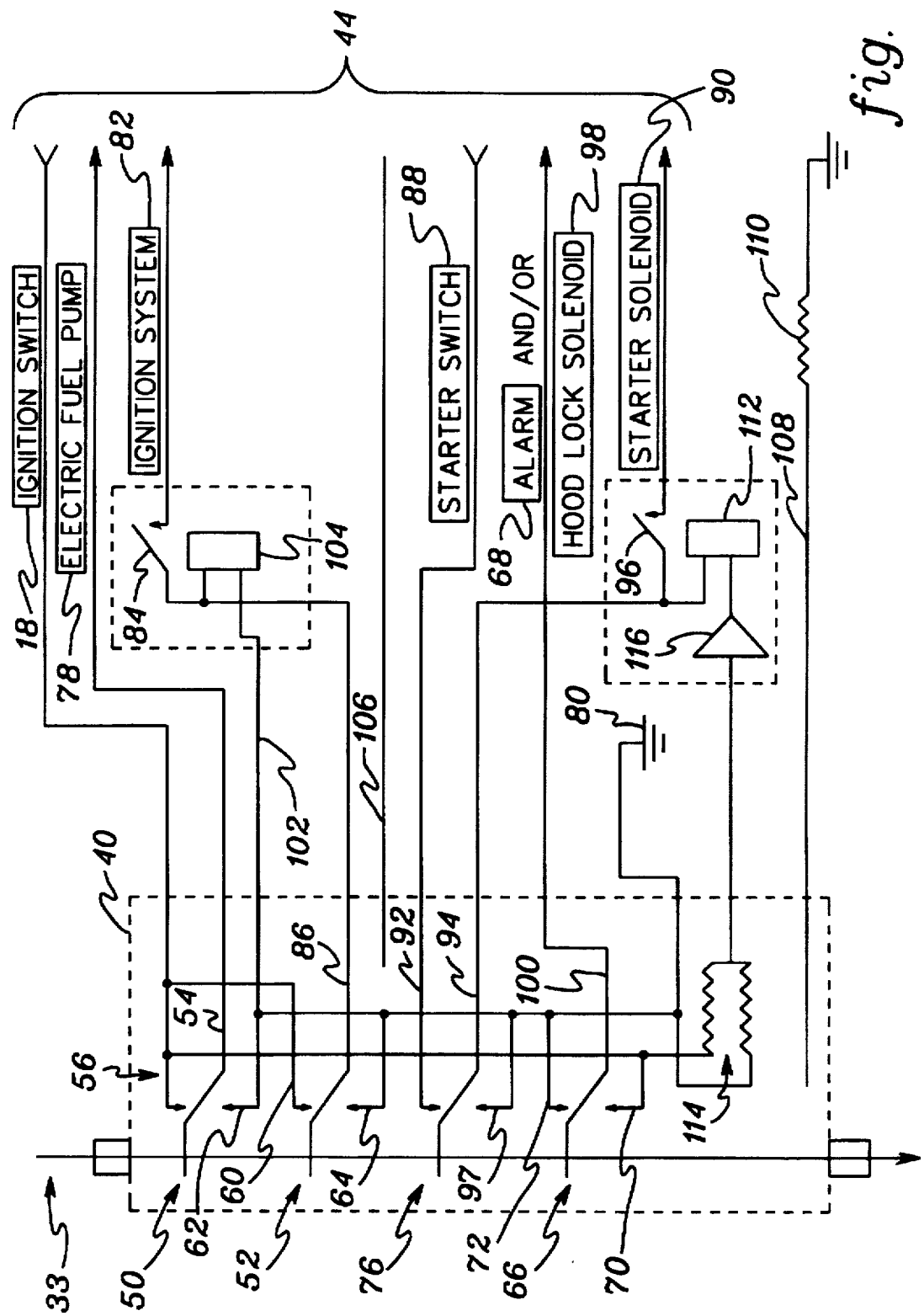
FIG. 8 is a schematic diagram of electrical aspects of the security device housing of FIG. 1.

FIG. 8 depicts electrical details of security housing 40. Trigger wire 33 is coupled to and controls switches 50, 52, 76 and 66. Switch 50 normally electrically connects electric fuel pump 78 with 12 VDC power (coupled to ignition switch 18) via wires 54 and 56, respectively. However, when triggered, switch 50 electrically connects electric fuel pump 78 with ground 80 via wires 54 and 62, respectively. Switch 52 normally electrically connects ignition system 82 with 12 VDC power (switch 84 is normally closed) via wires 86 and 60, respectively. Security relay 104 keeps switch 84 closed, so long as a connection to 12 VDC is made. When triggered, switch 52 connects ignition system 82 with ground 80 via wires 86 and 64, respectively.

Switch 76 normally electrically connects starter switch 88 with starter solenoid 90 (switch 96 is normally closed) via wires 92 and 94, respectively. However, when triggered, switch 76 connects starter solenoid 90 with ground 80 via wire 97. Security relay 112 keeps switch 96 closed, so long as the proper power is supplied through voltage divider 114 and window comparator 116. Window comparator 116 is looking for a particular voltage provided by voltage divider 114. One must know the resistance ratio of the voltage divider to know what voltage window comparator 116 is looking for. Thus, if wire 118 is cut, and an improper voltage applied, switch 96 will not close and no power will reach starter solenoid 90.

Finally, switch 66 normally connects conventional security system 68 (in this case, a sound alarm) and/or hood lock solenoid 98 with ground 80 via wires 100 and 72, respectively. However, when triggered, switch 66 connects alarm 68 and/or hood lock solenoid 98 with 12 VDC power via wires 100 and 70, respectively. As used herein, the term "conventional security system" refers to an automobile security system that issues sound and/or light upon sufficient physical disturbance to the vehicle, and/or an automobile security system that attempts to physically prevent an intruder from entering or exiting the passenger cabin of the vehicle. Alarm 68 may serve to startle the thief, who would not expect an alarm to be triggered after entry has already been gained.

In addition, several "dummy wires" are preferably included in wire bundle 44 to further thwart attempts to defeat security device 12. For example, dummy wire 102 connects security relay 104 with ground 80. Thus, cutting dummy wire 102 would affect nothing. As another example, dummy wire 106 is not actually connected to anything. As still another example, dummy wire 108 is merely connected at one end to a false load 110, so that if the wire is tested, it appears to connect to a functional portion of the automobile. Further, all the wires in bundle 44 may be the same color so that the thief cannot know, without tracing, which wire is connected to which portion of the automobile.

Figure 9:
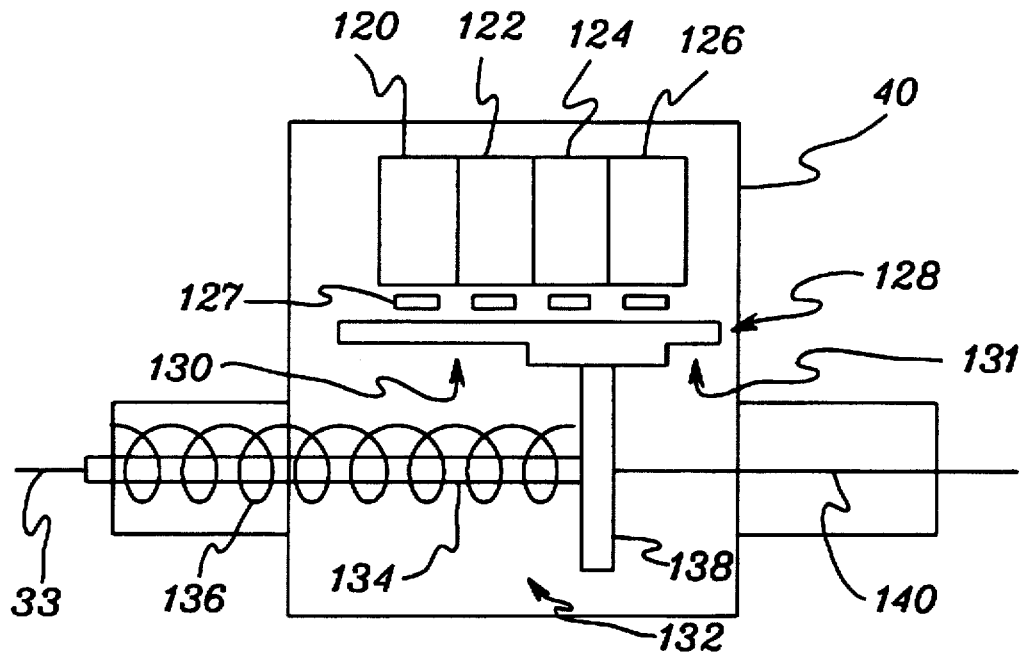
FIG. 9 depicts hardware aspects of the security device housing of FIG. 1.

FIG. 9 depicts hardware details of one embodiment of housing 40. Microswitches 120, 122, 124 and 126, and their corresponding contacts, e.g., contact 127, correspond to switches 50, 52, 76 and 66 of FIG. 8, respectively. Also shown is switch plate 128 including indents 130 and 131, and a plunger 132 connected to trigger wire 33. The stem 134 of plunger 132 is surrounded by a spring 136, so that if trigger wire 33 is pulled in either direction, head 138 of plunger 132 enters indent 130 or 131, and switch plate 128 pivots toward plunger 132, coming out of contact with the switch contacts, triggering them. It will be understood that switch plate 128 could take other forms, so long as the purpose of translating a sufficient movement of plunger 132 into triggering of the security device is satisfied. Optionally, cable 140 leaving housing 40 could be coupled to another such housing (not shown), so that if cable 140 were cut, the switches in the other housing would be triggered, affecting one or more other automobile functions. As another option, cable 140 could be coupled to a hood lock (described in more detail subsequently), so that if cable 140 were cut, the hood lock would trigger, preventing entry to the propulsion system from under the hood.

Figure 19:
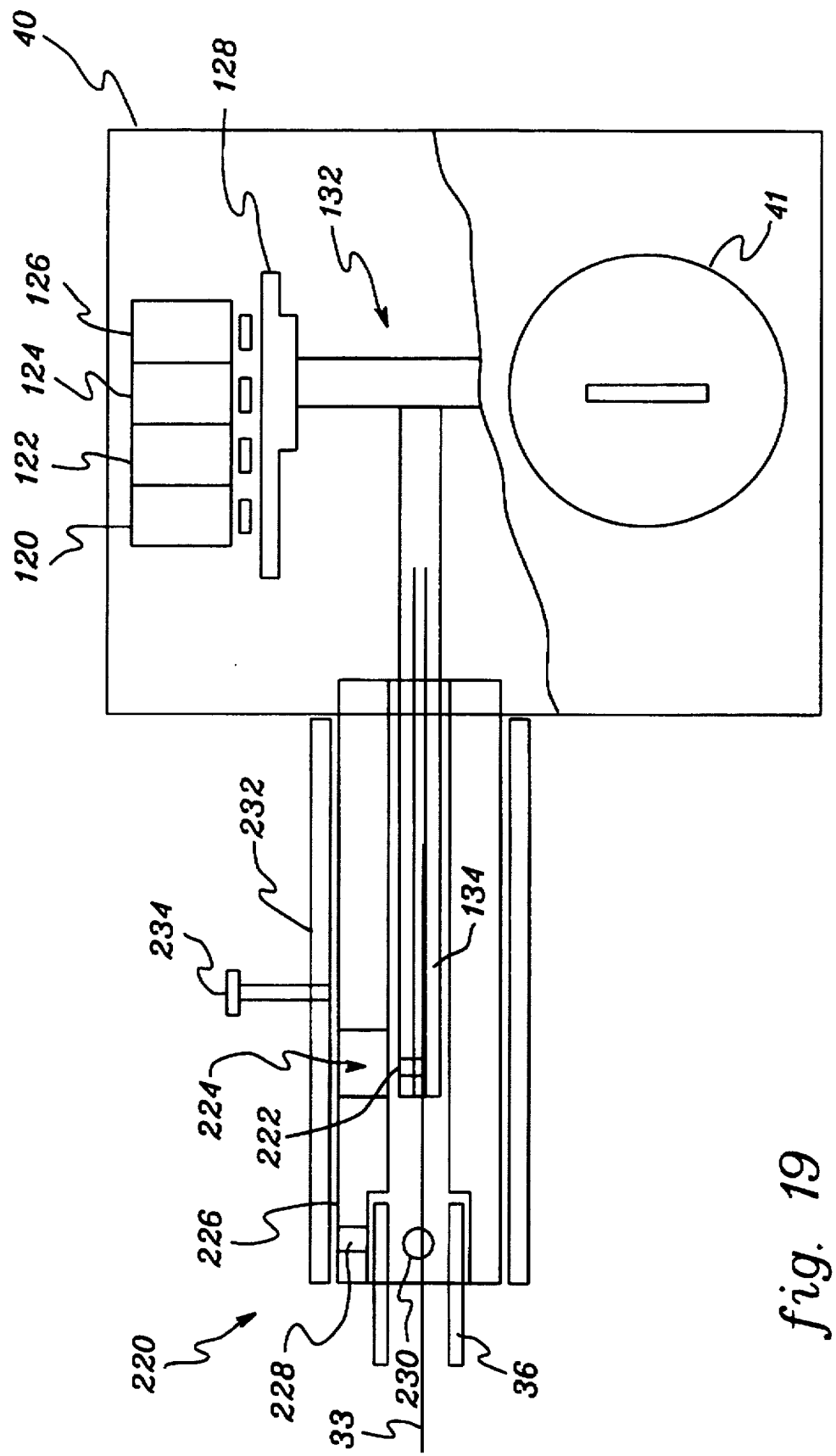
FIG. 19 depicts further hardware aspects associated with FIG. 9.

FIG. 19 depicts a partial cut-away and cross-sectional view of housing 40 with a final assembly 220 for connecting trigger wire 33 to plunger 132. Trigger wire 33 is inserted into the stem 134 of plunger 132 and connected thereto via set screw 222 accessed through access hole 224 in a wire housing 226, which is part of housing 40. Jacketed control cable 36 is connected to wire housing 226 by set screws 228 and 230. Finally, a cover sleeve (preferably metal) is placed over wire housing 226 and connected thereto via screw 234, which is preferably broken off after installation is complete, so that trigger wire 33 cannot easily be disengaged from plunger 132.

Figure 10:
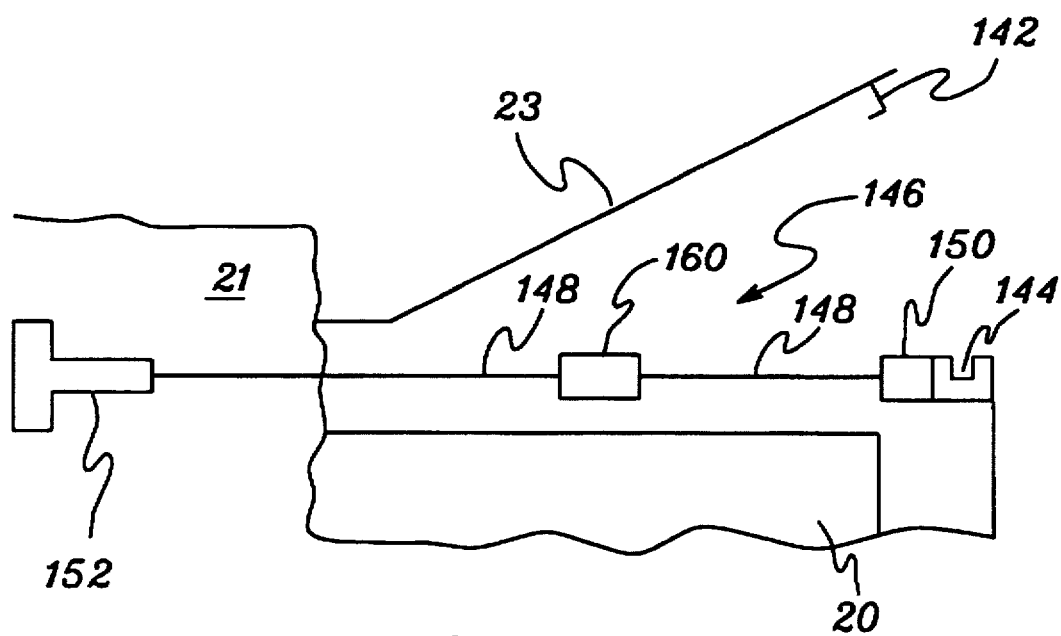
FIG. 10 depicts a hood latch system for the automobile of FIG. 1 in detail.
Figure 15:
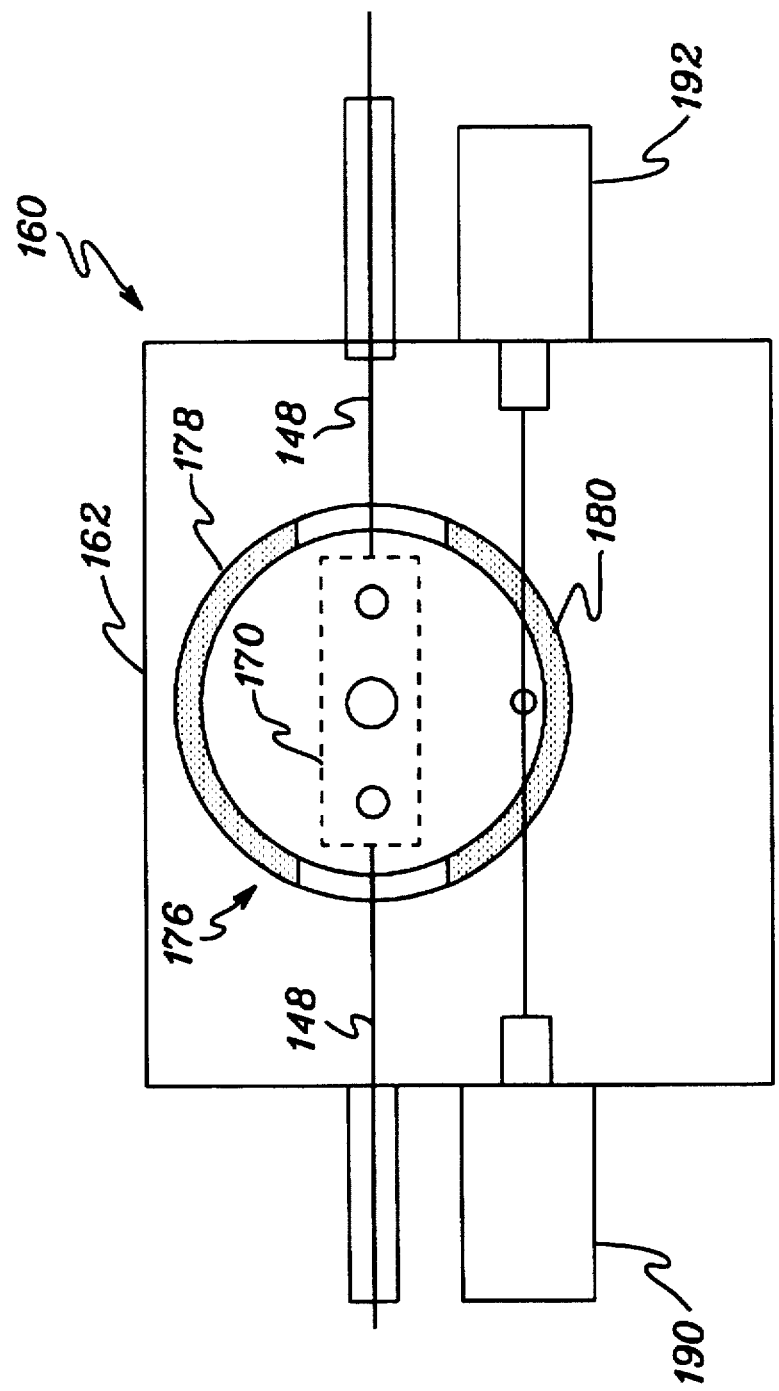
FIG. 15 is a top view of the hood lock of FIG. 11 with solenoids for locking and unlocking.

FIG. 10 depicts the hood 23 of automobile 10 of FIG. 1 with a hood latch system comprised of a hood latch including a male component 142 and a female component 144. The hood latch system also includes a hood latch release mechanism 146, including a cable 148 coupled to a release mechanism 150 and a remote trigger mechanism (e.g. lever 152) located in the passenger cabin 21. Normally, when the remote trigger mechanism is activated, hood latch release mechanism 150 causes the female component 144 to release the male component 142, allowing hood 23 to be raised and access to propulsion system 20 thereby provided. However, automobile 10 also includes a hood lock 160 according to the present invention. When actuated, hood lock 160 prevents cable 148 from moving, thereby preventing the release mechanism from releasing the latch.

FIG. 11 is a top view of hood lock 160. Housing 162 surrounds a portion of cable 148, and is preferably a security housing. For example, housing 162 could include a mechanical lock and key, such as that show in FIG. 2 for housing 40. Housing 162 is preferably placed around a portion of cable 148 that will not interfere with automobile operation. Cable 148 has been cut and the covering 164 partially stripped to expose ends 166 and 168. Exposed ends 166 and 168 are securely attached in some manner to movable member 170 (e.g., via set screws 172 and 174), thereby splicing member 170 onto cable 148 and causing the member to move with the cable. Also shown in FIG. 11 is rotatable member 176 including sections 178 and 180 having breaks therein creating a throughopening 182.

Movable member 170 is sized to fit within throughopening 182. Rotatable member 176 rotates about pivot point 184, which is connected to an upper inner surface 190 of the housing (see FIG. 12). FIG. 11 depicts hood lock 160 in the unlocked position, where movable member 170 passes through throughopening 182 along with cable 148, allowing the hood latch to be freely released. Housing 162 is sized such that when the hood latch is released, movable member 170 is not obstructed. When rotatable member 176 is actuated, as shown most clearly in FIG. 13, movable member 170 cannot move freely, as it is blocked by sections 178 and 180. If member 170 cannot move, then neither can cable 148, and the hood latch cannot be released.

In one embodiment, rotatable member 176 takes the form of a rotor actuated mechanically by cable 186 attached at opening 188. Cable 186 could be coupled to a remote release mechanism (not shown) located, for example, in passenger cabin 21. Although depicted as round herein, it will be understood that rotatable member could take other forms, so long as it is capable of both allowing movable member 170 therethrough and preventing movement of cable 148 upon actuation that would release the hood latch. It will also be understood that rotatable member 176 could be connected to another part of housing 162, for example, to a bottom surface 188 (see FIG. 12). It will further be understood that the rotatable member may be actuated in other ways. For example, rotatable member 176 may be electrically controlled and connected to switch 66 via wire 100 from FIG. 6. As another example, shown in FIG. 13, rotatable member 176 could be actuated by lock and unlock solenoids 190 and 192, respectively.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A security device for an automobile including a steering column, a steering column lock, a steering column cover, an ignition switch lock coupled to the steering column lock and an ignition switch lock mounting assembly, the security device comprising:

indicating means for indicating an attempt to defeat the steering column lock and/or the ignition switch lock, comprising means for indicating an attempt to remove at least a portion of the steering column cover, wherein the indicating means also comprises a wire connected to a bead, and wherein the bead is held in place between an interior surface of the ignition switch lock mounting assembly and a recess on an outer surface of the ignition switch lock; and disabling means coupled to the indicating means for affecting one or more functions of the automobile in response to the indicating means indicating the attempt.

2. The security device of claim 1, wherein the disabling means comprises means for disabling the one or more functions of the automobile in response to the indicating means indicating the attempt.

3. The security device of claim 2, wherein the automobile further includes a propulsion system, and wherein the disabling means comprises means for disabling a function of the propulsion system in response to the indicating means indicating the attempt.

4. The security device of claim 3, wherein the propulsion system comprises an internal combustion engine including an air intake manifold, wherein the disabling means comprises a container of a compressed gas other than oxygen, and wherein the compressed gas is released into the air intake manifold in response to the indicating means indicating the attempt, whereby the compressed gas serves to prevent combustion.

5. The security device of claim 4, wherein the compressed gas comprises one of carbon dioxide, nitrogen and halogen.

6. The security device of claim 1, wherein the automobile further includes a power supply, and wherein the disabling means comprises at least one switch electrically coupling a portion of the automobile corresponding to the one or more functions to one of the power supply and a grounded point within the automobile.

7. The security device of claim 6, wherein the at least one switch is resettable.

8. The security device of claim 7, wherein the at least one switch is housed within a security housing including a lock for resetting the at least one switch.

9. The security device of claim 8, wherein the lock comprises a conventional lock operated by a key.

10. The security device of claim 8, wherein the lock comprises a keypad for entering a code to initiate resetting the switch.

11. The security device of claim 1, wherein the disabling means comprises means for enabling a function of the automobile in response to the indicating means indicating the attempt.

12. The security device of claim 11, wherein the automobile further includes a power supply, wherein the function requires power, wherein the enabling means comprises a switch electrically coupling the portion of the automobile corresponding to the function to one of the power supply and a grounded point within the automobile, wherein the switch normally electrically couples the portion of the automobile corresponding to the function to the grounded point, and wherein the switch instead electrically couples the portion of the automobile corresponding to the function to the power supply in response to the indicating means indicating the attempt.

13. The security device of claim 12, wherein the automobile further includes a hood and a hood lock, the function comprising locking the hood lock and the portion of the automobile corresponding to the function being the hood lock.

14. The security device of claim 12, wherein the automobile further comprises a conventional security system requiring power, the function comprising enabling the conventional security system and the portion of the automobile corresponding to the function being the conventional security system.

15. The security device of claim 1 wherein the bead comprises a shatterable bead.

16. The security device of claim 1 further comprising a metal tube surrounding the wire and inserted through an aperture in the ignition switch lock mounting assembly.

17. The security device of claim 16, wherein the metal tube includes a flared end within the ignition switch lock mounting assembly to prevent exiting the aperture.

18. The security device of claim 2, wherein the automobile further includes a power supply, wherein the one or more functions require power, wherein the disabling means comprises a switch electrically coupling the portion of the automobile corresponding to the one or more functions to one of the power supply and a grounded point within the automobile, wherein the switch normally electrically couples the portion of the automobile corresponding to the one or more functions to the power supply, and wherein the switch instead electrically couples the portion of the automobile corresponding to the one or more functions to the grounded point in response to the indicating means indicating the attempt.

19. The security device of claim 6, wherein the disabling means further comprises a wire coupled to the at least one switch.

20. The security device of claim 19, wherein the wire is surrounded by an armored jacket.

21. The security device of claim 19 further comprising means for triggering the at least one switch if the wire is disturbed.

22. The security device of claim 6, wherein the at least one switch is electrically coupled to the portion of the automobile corresponding to the one or more functions, the power supply and the grounded point by one or more true wires, the security device further comprising one or more dummy wires to inhibit identifying the one or more true wires.

23. The security device of claim 22, wherein cutting the one or more dummy wires affects the portion of the automobile corresponding to the one or more functions.

24. A security device for an automobile including a passenger cabin, a propulsion system, a hood covering the propulsion system, a hood latch and a hood latch release mechanism including a cable coupled to the hood latch and a trigger mechanism within the passenger cabin, the security device comprising:

a housing surrounding a portion of the cable;

a rotatable member coupled to an interior surface of the housing, the rotatable member including two sections spaced apart such that a throughopening is created in the rotatable member; and a movable member situated within the housing and connected to the cable, the moveable member being sized to fit within the throughopening, wherein when the rotatable member is rotated such that the two sections line up with either end of the movable member, thereby preventing the cable from moving and the hood latch from being released.

25. The security device of claim 24, wherein the rotatable member comprises an electric rotor.

26. The security device of claim 24, wherein the movable member is spliced onto the cable.

27. The security device of claim 24 further comprising a solenoid for causing rotation of the rotating member.

28. The security device of claim 24 further comprising a mechanical system for causing rotation of the rotating member.

29. The security device of claim 24, wherein the housing is a security housing.

30. A method of installing a security device for an automobile including a passenger cabin, a propulsion system, a hood covering the propulsion system, a hood latch and a hood latch release mechanism including a cable coupled to the hood latch and a trigger mechanism within the passenger cabin, the security device comprising a housing surrounding a portion of the cable, a rotatable member coupled to an interior surface of the housing, the rotatable member including two sections spaced apart such that a throughopening is created in the rotatable member, and a movable member housed within the housing and connected to the cable, the moveable member being sized to fit within the throughopening, wherein when the rotatable member is rotated such that the two sections line up with either end of the movable member, thereby preventing the cable from moving and the hood latch from being released, the method comprising steps of:

cutting the cable to create two free ends;

splicing the movable member onto the cable at the two free ends;

securing the housing with the rotatable member around the movable member and cable; and connecting the rotatable member to an actuator.

31. The method of claim 30, wherein the step of cutting comprising cutting the cable in an area that minimizes interference with the propulsion system.

32. The method of claim 30, wherein the rotatable member is electrically actuated, and wherein step of connecting comprises coupling the rotatable member to a power source.

33. The method of claim 30, wherein the step of connecting comprises connecting the rotatable member to a remote actuator.

* * * * *

UNITED STATES PATENT AND TRADEMARK OFFICE
CERTIFICATE OF CORRECTION

PATENT NO. : 5,793,122

DATED : August 11, 1998

INVENTOR(S) : Dingwall et al.

It is certified that error appears in the above-identified patent and that said Letters Patent is hereby corrected as shown below:

In the Drawings: Sheet 12 of 13, after "fig. 16", insert --PRIOR ART--.

Sheet 12 of 13, after "fig. 17", insert --PRIOR ART--.

Col. 8, line 15, after "defeat", insert --at least one of--.

Col. 8, line 16, delete "and/or" and replace with --and--.

Signed and Sealed this

Ninth Day of February, 1999

*Acting Commissioner of Patents and Trademarks*

Attest:

*Attesting Officer*